(12) United States Patent
Gindt et al.

(10) Patent No.: US 11,815,386 B2
(45) Date of Patent: Nov. 14, 2023

(54) FUEL LEVEL DISPLAY CIRCUIT FOR DUAL TANK CONFIGURATION

(71) Applicant: Ariens Company, Brillion, WI (US)

(72) Inventors: Daniel J. Gindt, Appleton, WI (US); Nicholas R. Schrubbe, Reedsville, WI (US); Clayton J. Van Thiel, Little Chute, WI (US)

(73) Assignee: Ariens Company, Brillion, WI (US)

( * ) Notice: Subject to any disclaimer, the term of this patent is extended or adjusted under 35 U.S.C. 154(b) by 688 days.

(21) Appl. No.: 17/011,795

(22) Filed: Sep. 3, 2020

(65) Prior Publication Data

US 2022/0065684 A1 Mar. 3, 2022

(51) Int. Cl.
*G01F 23/60* (2006.01)
*F16K 11/02* (2006.01)

(52) U.S. Cl.
CPC ............ *G01F 23/603* (2013.01); *F16K 11/02* (2013.01)

(58) Field of Classification Search
CPC .............................. G01F 23/603; F16K 11/02
USPC ...................................................... 340/450.2
See application file for complete search history.

(56) References Cited

U.S. PATENT DOCUMENTS

| | | |
|---|---|---|
| 5,816,224 A | 10/1998 | Welsh et al. |
| 2011/0297260 A1* | 12/2011 | Mason ...................... F04F 5/10 |
| | | 137/565.29 |
| 2014/0090466 A1* | 4/2014 | Schragal ............... G01F 23/443 |
| | | 73/313 |
| 2019/0263257 A1* | 8/2019 | Komura ................. B60K 15/03 |
| 2020/0108714 A1* | 4/2020 | Selvaraj ................ B60K 15/03 |

FOREIGN PATENT DOCUMENTS

| | | |
|---|---|---|
| CN | 102345518 A | 2/2012 |
| CN | 203331843 U | 12/2013 |
| DE | 2802193 C2 | 1/1987 |
| NL | 198203217 A | 3/1984 |

OTHER PUBLICATIONS

Aircraft Spruce and Specialty Co., "Aerospace Logic Dual Fuel Level for Cessna Pennycap Systems," <https://www.aircraftspruce.com/catalog/inpages/aerofl212.php> webpage accessed on Jun. 6, 2020.
Aircraft Spruce and Specialty Co., "Dual Fuel Level (FL-2) Quick Reference Guide," <https://www.aircraftspruce.com/catalog/pdf/fl2qref.pdf> 2001.

(Continued)

*Primary Examiner* — Kerri L McNally
(74) *Attorney, Agent, or Firm* — Michael Best & Friedrich LLP

(57) ABSTRACT

A fuel level circuit for dual tank configuration includes fuel level sensors in each of two tanks and a fuel level display that can display the fuel level in one tank. The tank to be displayed on the fuel level display is selected by a flow diverting valve that selects the tank from which fuel will be delivered to a prime mover. A magnetic element moves with the flow diverting valve to actuate a magnetic switch to open or close a circuit element. A fuel selection relay places the fuel level display in communication with the fuel level sensor of the selected fuel tank in response to the magnetic switch opening and closing the circuit element.

11 Claims, 2 Drawing Sheets

(56) References Cited

OTHER PUBLICATIONS

Aircraft Spruce and Specialty Co., "Electronics International FL-2 Dual Fuel Level Gauge—Resistive," <https://www.aircraftspruce.com/catalog/inpages/ei-digitalgraphic5d.php> webpage accessed on Jun. 3, 2020.
Electronics International Inc., "Dual Fuel Level (FL-2RA-12, FL-2RA-24 and FL-2CA) (2nd Generation Instruments) Operating and Installation Instructions," 2001, 26 pages.
Landpride.com, "Land Pride: Zero Turn Mowers ZSR54 & ZSR60 (357-344M Operator's Manual)," <https://www.landpride.com/ari/attach/lp/public/manuals/357-344m.pdf> printed Jun. 16, 2017.
Messick's, "Kubota ZD1211 Diesel Zero Turn Overview by Messicks," <https://www.youtube.com/watch?v=e8p5DkUnJh4> posted on Feb. 2, 2016.
U.S. Department of Transportation: Federal Aviation Administration—Flight Standards Service, "FAA—Aviation Maintenance Technician Handbook—Airframe (vol. 2: FAA-H-8083-31A)," <https://www.faa.gov/regulations_policies/handbooks_manuals/aircraft/media/amt_airframe_hb_vol_2.pdf> 2018.

\* cited by examiner

FUEL LEVEL DISPLAY CIRCUIT FOR DUAL TANK CONFIGURATION

BACKGROUND

The present invention relates to a fuel level display circuit for a dual tank configuration.

SUMMARY

In one embodiment, the invention provides a circuit comprising: a flow diverting valve actuable between a first position to select flow of fuel from a first fuel tank and a second position to select flow of fuel from a second fuel tank; a magnetic element movable in response to actuation of the flow diverting valve between a first position in response to the flow diverting valve being actuated to select the first fuel tank and a second position in response to the flow diverting valve being actuated to select the second fuel tank; a first fuel level sensor in the first fuel tank and operable to sense a level of fuel in the first fuel tank; a second fuel level sensor in the second fuel tank and operable to sense a level of fuel in the second fuel tank; a magnetic switch operable to open a circuit element in response to the magnetic element being in the first position and to close the circuit element in response to the magnetic element being in the second position; a fuel level display; and a fuel selection relay communicating with each of the magnetic switch, the first fuel level sensor, the second fuel level sensor, and the fuel level display, and operable to place the fuel level display in communication with the first fuel level sensor in response to the magnetic switch opening the circuit element and place the fuel level display in communication with the second fuel level sensor in response to the magnetic switch closing the circuit element; wherein the fuel level display displays the level of fuel in the first tank as sensed by the first fuel level sensor when the fuel level display is in communication with the first fuel level sensor and displays the level of fuel in the second tank as sensed by the second fuel level sensor when the fuel level display is in communication with the second fuel level sensor.

In some embodiments, the magnetic element is integrally formed with the flow diverting valve. In some embodiments, at least one of the first fuel level sensor and the second fuel level sensor includes a float on a magnetic reed switch, the float moving up and down on the magnetic reed switch, the float floating in the fuel, a resistance of the magnetic reed switch varying as a function of the height of the float on the magnetic reed switch. In some embodiments, the fuel level display is configured to display a fuel level of only one of the first and second fuel tanks at a time. In some embodiments, the fuel selection relay communicates wirelessly with at least one of the magnetic switch, the first fuel level sensor, the second fuel level sensor, and the fuel level display.

In another embodiment the invention provides a method for displaying on a fuel level display a fuel level in a selected one of a first fuel tank and a second fuel tank, the method comprising: providing a flow diverting valve actuable between a first position to select flow of fuel from a first fuel tank and a second position to select flow of fuel from a second fuel tank; moving a magnetic element in response to actuation of the flow diverting valve between a first position in response to the flow diverting valve being actuated to select the first fuel tank and a second position in response to the flow diverting valve being actuated to select the second fuel tank; positioning a first fuel level sensor in the first fuel tank to read a level of fuel in the first fuel tank; positioning a second fuel level sensor in the second fuel tank to read a level of fuel in the second fuel tank; actuating a magnetic switch to open a circuit element in response to the magnetic element being in the first position and to close the circuit element in response to the magnetic element being in the second position; communicating a fuel selection relay with each of the magnetic switch, the first fuel level sensor, the second fuel level sensor, and the fuel level display; placing, with the fuel selection relay, the fuel level display in communication with the first fuel level sensor in response to the magnetic switch opening the circuit element; placing, with the fuel selection relay, the fuel level display in communication with the second fuel level sensor in response to the magnetic switch closing the circuit element; displaying on the fuel level display the level of fuel in the first tank as sensed by the first fuel level sensor when the fuel level display is in communication with the first fuel level sensor; and displaying on the fuel level display the level of fuel in the second tank as sensed by the second fuel level sensor when the fuel level display is in communication with the second fuel level sensor.

In some embodiments, providing a flow diverting valve includes integrally forming the magnetic element with the flow diverting valve. In some embodiments, positioning a first fuel level sensor in the first fuel tank includes positioning a float on a magnetic reed switch. In some embodiments, reading a level of fuel in the first fuel tank includes moving the float up and down on the magnetic reed switch with the level of fuel in the first fuel tank and varying a resistance of the magnetic reed switch as a function of the height of the float on the magnetic reed switch. In some embodiments, displaying the fuel level in the first tank includes displaying only the fuel level in the first tank and not displaying the fuel level of the second tank. In some embodiments, communicating includes at least one wireless communication.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
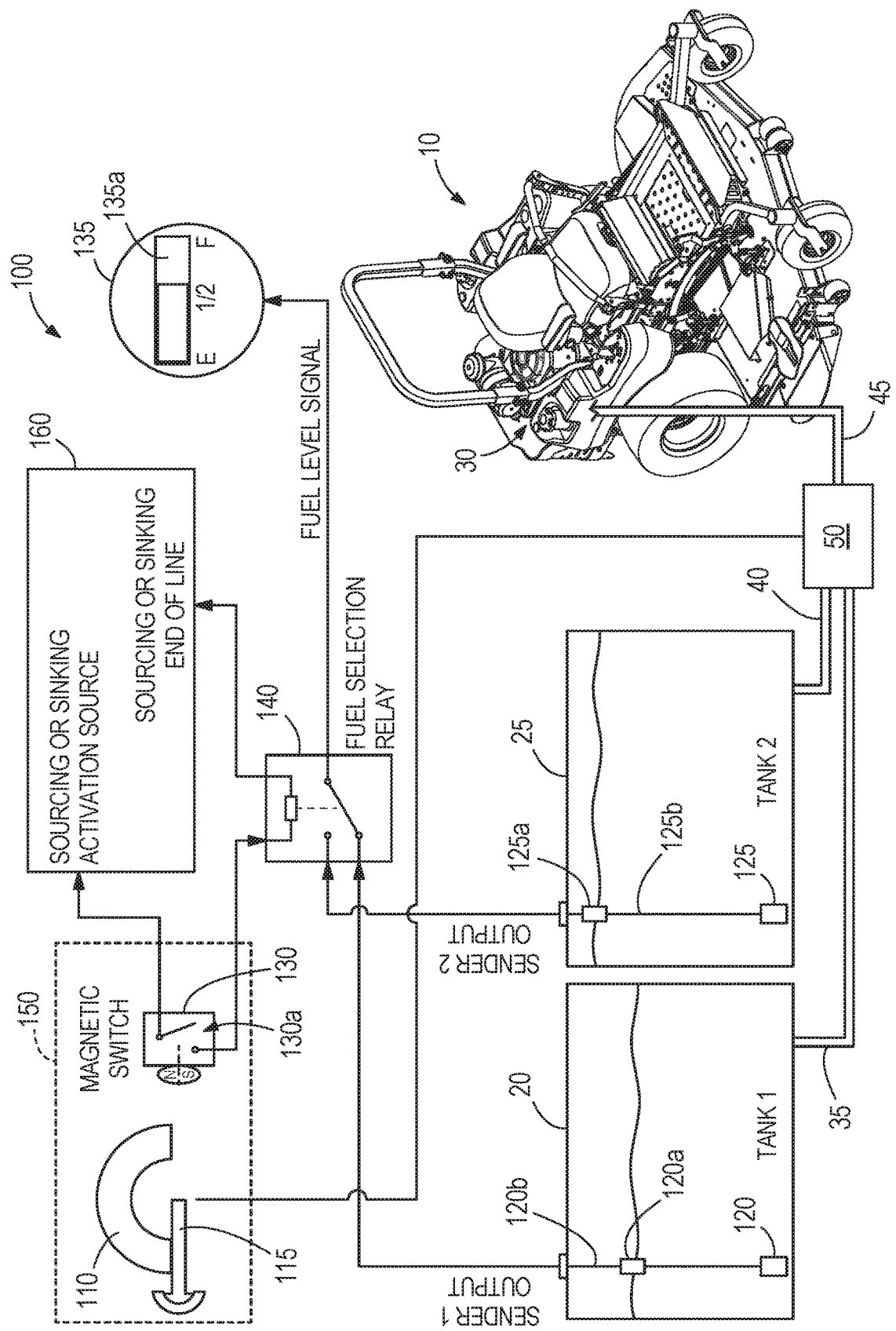
FIG. 1 is a schematic of a fuel level display circuit for a dual tank configuration with a first tank selected.
Figure 2:
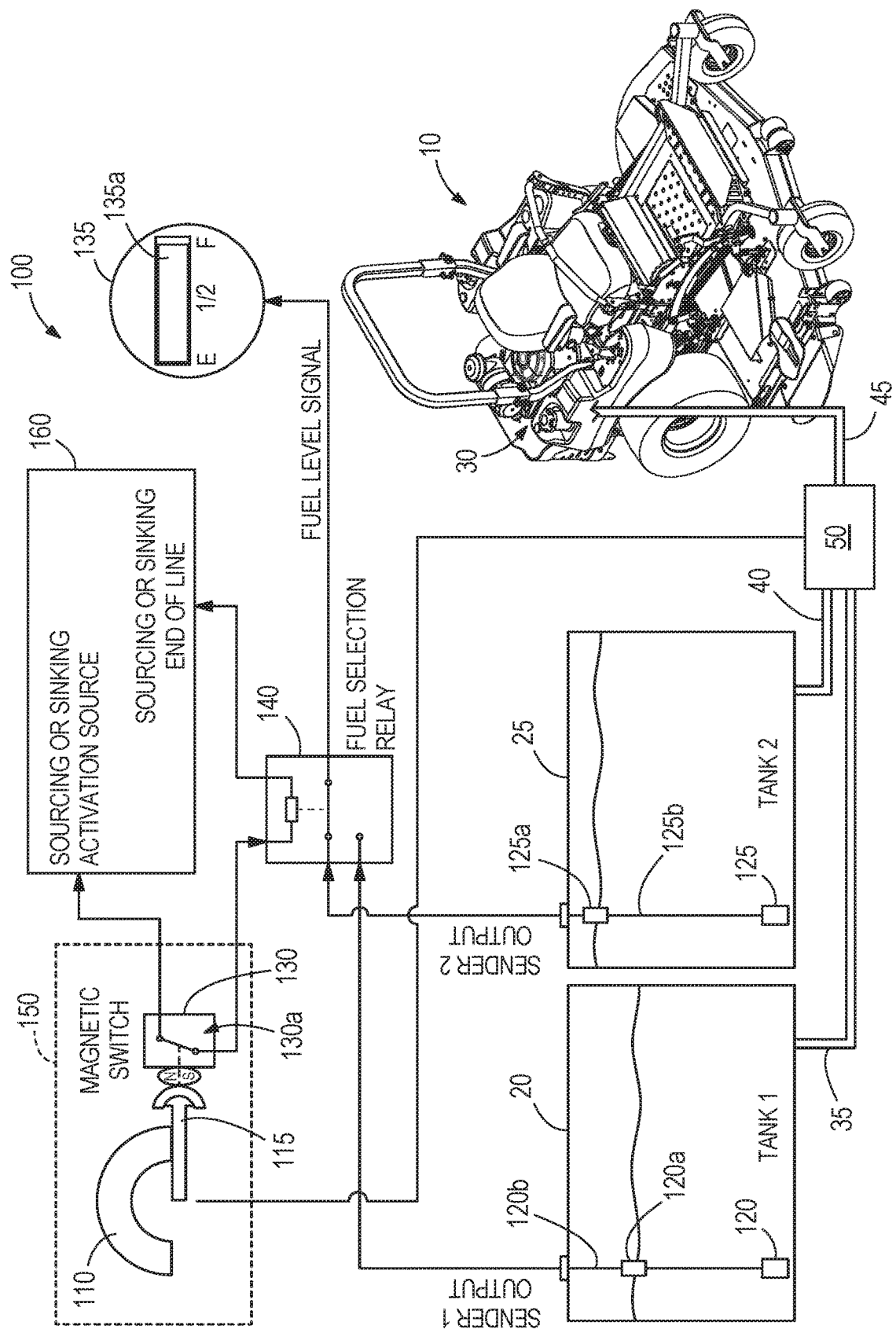
FIG. 2 is a schematic of the fuel level display circuit with a second tank selected.

FIGS. 1 and 2 illustrate a fuel level display circuit 100 for a dual tank configuration which can be applied to any application. The circuit 100 can be used in any machine or application having any type of liquid fuel and a prime mover using the fuel to perform work. The illustrated example is an outdoor power equipment machine in the form of a gasoline-powered lawn mower 10 having a first fuel tank 20, a second fuel tank 25, and a prime mover in the form of an internal combustion engine 30. Such lawn mower 10 can be a large walk-behind mower or a riding lawn mower in the form of a tractor or zero-turn radius mower. The invention is also applicable to substantially any gasoline-powered or other liquid-powered vehicle or equipment having two fuel tanks.

The first and second fuel tanks 20, 25 provide gasoline to the engine 30 by way of first, second, and third fuel lines 35, 40, 45. The first and second fuel line 35, 40 communicate between the respective first and second fuel tanks 20, 25 and a fuel valve 50. The third fuel line 45 communicates between the fuel valve 50 and the engine 30. The fuel valve 50 is actuable to place a selected one of the first and second fuel lines 35, 40 in communication with the third fuel line 45 so that fuel from the selected one of the first and second fuel tanks 20, 25 (associated with the selected fuel line 35, 40) is supplied to the engine 30.

The circuit 100 includes a flow diverting valve 110, a magnetic element 115, a first fuel level sensor 120, a second fuel level sensor 125, a magnetic switch 130, a fuel level display 135, and a fuel selection relay 140.

The flow diverting valve 110 is a manually- or automatically-actuated valve that is actuable between a first position (FIG. 1) and a second position (FIG. 2) to select which of the first and second fuel tanks 20, 25 feeds fuel to the prime mover 30. Fuel flows from the first fuel tank 20 to the prime mover 30 when the flow diverter 110 is in the first position and flows from the second fuel tank 25 to the prime mover 30 when the flow diverter 110 is in the second position.

The magnetic element 115 is movable between a first position in response to the flow diverting valve 110 being moved into the first position (i.e., actuated to select the first fuel tank 20) and a second position in response to the flow diverting 110 valve being moved into the second position (i.e., actuated to select the second fuel tank 20).

Although described as separate elements, the flow diverting valve 110 and the magnetic element 115 may be integrally formed or permanently joined to behave as a single unit. Unless specifically described or claimed as separate elements, integrally-formed, or permanently joined, it will be understood that the flow diverting valve 110 and magnetic element 115 can be provided and configured in any of these manners. If integrally formed, the magnetic element 115 may be a magnetized portion of the flow diverting valve 110. If not integrally formed, the magnetic element 115 may be mounted directly or indirectly (i.e., by way of intervening elements) to the flow diverting valve 110 such that it is movable in response to actuation of the flow diverting valve 110.

The first and second fuel level sensors 120, 125, which can also be called first and second sending units, are identical to each other and include a float 120a, 125a moving up and down on a magnetic reed switch 120b, 125b. The first and second fuel level sensors 120, 125 may also be referred to as resistive sending units. The float floats 120a, 125a in the fuel contained the in first and second fuel tanks 20, 25 and moves up and down with respect to the magnetic reed switch 120b, 125b as the fuel level moves up and down. The resistance of each sending unit 120, 125 varies within a range (e.g., 30Ω-240Ω) as a function of the height of the float 120a, 125a on the magnetic reed switch 120b, 125b. The first and second fuel level sensors 120, 125 therefore generate signals corresponding to their resistances, which are a function of the fuel level in the respective first and second fuel tanks 20, 25. The first and second fuel level sensors 120, 125 are therefore operable to sense a level of fuel in the respective first and second fuel tanks 20, 25.

The magnetic switch 130 is operable to open a circuit element 130a in response to the magnetic element 115 being in the first position and to close the circuit element 130a in response to the magnetic element 115 being in the second position. The circuit element 130a in the illustrated embodiment is a contact in an electrical circuit. The magnetic switch 130 is actuated magnetically without physical contact. The flow diverting valve 110, magnetic element 115, and magnetic switch 130 may be described together as a non-contact magnetic tank selector switch 150.

The fuel level display 135 includes a display gauge 135a. The fuel level display 135 interprets the signal from a selected one of the first or second level sensors 120, 125 and displays a corresponding fuel level on the display of gauge 135a. As illustrated and as will be explained below, the fuel level display 135 will only display one of the fuel levels at a time and the non-contact magnetic tank selector switch 150 toggles which of the first and second fuel sensors 120, 125 provides the signal to the fuel level display 135.

The fuel selection relay 140 communicates with the magnetic switch 130, the first fuel level sensor 120, the second fuel level sensor 125, and the fuel level display 135. The communication may be by wire or wireless through any known protocol such as Bluetooth® and WiFi. The fuel selection relay 140 is movable between first and second positions. In the first position (FIG. 1), the fuel selection relay 140 places the fuel level display 135 in communication with the first fuel level sensor 120 so that fuel level of the first fuel tank 20 is displayed in the gauge 135a. In the second position (FIG. 2), the fuel selection relay 140 places the fuel level display 135 in communication with the second fuel level sensor 125 so that fuel level of the second fuel tank 25 is displayed in the gauge 135a.

In this regard, the fuel selection relay 140 is operable to place the fuel level display 135 in communication with the first fuel level sensor 120 in response to the non-contact magnetic tank selector switch 150 opening the circuit element 130a. The fuel selection relay 140 is also operable to place the fuel level display 135 in communication with the second fuel level sensor 125 in response to the non-contact magnetic tank selector switch 150 closing the circuit element 130a. Also, the fuel level display 135 displays the level of fuel in the first tank 20 as sensed by the first fuel level sensor 120 when the fuel level display 135 is in communication with the first fuel level sensor 120 and displays the level of fuel in the second tank 25 as sensed by the second fuel level sensor 125 when the fuel level display 135 is in communication with the second fuel level sensor 125.

A power source 160 such as a battery or alternator provides voltage across the fuel selection relay when the circuit element 130a is closed.

The invention is not limited to the foregoing descriptions and associated embodiments, and is capable of alternative embodiments including modifications and alternative configurations and with alternatively components known to those of ordinary skill in the art. The specific embodiments disclosed herein long with all such alternative embodiments, modifications, and alternative configurations are intended to be included within the scope of the appended claims. Additionally, alternative combinations of elements and functions may be included in the alternative embodiments without departing from the scope of the appended claims. Although specific terms are employed herein, they are used in a generic and descriptive sense only and not for purposes of limitation.

What is claimed is:

1. A circuit comprising:
   a flow diverting valve actuable between a first position to select flow of fuel from a first fuel tank and a second position to select flow of fuel from a second fuel tank;

a magnetic element movable in response to actuation of the flow diverting valve between a first position in response to the flow diverting valve being actuated to select the first fuel tank and a second position in response to the flow diverting valve being actuated to select the second fuel tank;

a first fuel level sensor in the first fuel tank and operable to sense a level of fuel in the first fuel tank;

a second fuel level sensor in the second fuel tank and operable to sense a level of fuel in the second fuel tank;

a magnetic switch operable to open a circuit element in response to the magnetic element being in the first position and to close the circuit element in response to the magnetic element being in the second position;

a fuel level display; and a fuel selection relay communicating with each of the magnetic switch, the first fuel level sensor, the second fuel level sensor, and the fuel level display, and operable to place the fuel level display in communication with the first fuel level sensor in response to the magnetic switch opening the circuit element and place the fuel level display in communication with the second fuel level sensor in response to the magnetic switch closing the circuit element;

wherein the fuel level display displays the level of fuel in the first tank as sensed by the first fuel level sensor when the fuel level display is in communication with the first fuel level sensor and displays the level of fuel in the second tank as sensed by the second fuel level sensor when the fuel level display is in communication with the second fuel level sensor.

2. The circuit of claim 1, wherein the magnetic element is integrally formed with the flow diverting valve.

3. The circuit of claim 1, wherein at least one of the first fuel level sensor and the second fuel level sensor includes a float on a magnetic reed switch, the float moving up and down on the magnetic reed switch, the float floating in the fuel, a resistance of the magnetic reed switch varying as a function of the height of the float on the magnetic reed switch.

4. The circuit of claim 1, wherein the fuel level display is configured to display a fuel level of only one of the first and second fuel tanks at a time.

5. The circuit of claim 1, wherein the fuel selection relay communicates wirelessly with at least one of the magnetic switch, the first fuel level sensor, the second fuel level sensor, and the fuel level display.

6. A method for displaying on a fuel level display a fuel level in a selected one of a first fuel tank and a second fuel tank, the method comprising:

providing a flow diverting valve actuable between a first position to select flow of fuel from a first fuel tank and a second position to select flow of fuel from a second fuel tank;

moving a magnetic element in response to actuation of the flow diverting valve between a first position in response to the flow diverting valve being actuated to select the first fuel tank and a second position in response to the flow diverting valve being actuated to select the second fuel tank;

positioning a first fuel level sensor in the first fuel tank to read a level of fuel in the first fuel tank;

positioning a second fuel level sensor in the second fuel tank to read a level of fuel in the second fuel tank;

actuating a magnetic switch to open a circuit element in response to the magnetic element being in the first position and to close the circuit element in response to the magnetic element being in the second position;

communicating a fuel selection relay with each of the magnetic switch, the first fuel level sensor, the second fuel level sensor, and the fuel level display;

placing, with the fuel selection relay, the fuel level display in communication with the first fuel level sensor in response to the magnetic switch opening the circuit element;

placing, with the fuel selection relay, the fuel level display in communication with the second fuel level sensor in response to the magnetic switch closing the circuit element;

displaying on the fuel level display the level of fuel in the first tank as sensed by the first fuel level sensor when the fuel level display is in communication with the first fuel level sensor; and displaying on the fuel level display the level of fuel in the second tank as sensed by the second fuel level sensor when the fuel level display is in communication with the second fuel level sensor.

7. The method of claim 6, wherein providing a flow diverting valve includes integrally forming the magnetic element with the flow diverting valve.

8. The method of claim 6, wherein positioning a first fuel level sensor in the first fuel tank includes positioning a float on a magnetic reed switch.

9. The method of claim 8, wherein reading a level of fuel in the first fuel tank includes moving the float up and down on the magnetic reed switch with the level of fuel in the first fuel tank and varying a resistance of the magnetic reed switch as a function of the height of the float on the magnetic reed switch.

10. The method of claim 6, wherein displaying the fuel level in the first tank includes displaying only the fuel level in the first tank and not displaying the fuel level of the second tank.

11. The method of claim 6, communicating includes at least one wireless communication.

* * * * *